United States Patent [19]
Vertegaal

[11] 3,744,087

[45] July 10, 1973

[54] DEVICE FOR MAKING A CUT INTO THE BODY OF POULTRY

[75] Inventor: Jacobus Gerardus Vertegaal, Boxmeer, Netherlands

[73] Assignee: Stork-Amsterdam N.V., Amstedveen, Netherlands

[22] Filed: Oct. 19, 1970

[21] Appl. No.: 81,885

[30] Foreign Application Priority Data
Oct. 16, 1969 Netherlands.................... 6915661

[52] U.S. Cl. .................................................. 17/11
[51] Int. Cl. ............................................ A22c 21/00
[58] Field of Search ........................................ 17/11

[56] References Cited
UNITED STATES PATENTS
3,213,488  10/1965  Volpe ................................. 17/11

Primary Examiner—Robert W. Michell
Assistant Examiner—John F. Pitrelli
Attorney—Edmund M. Jaskiewicz

[57] ABSTRACT

A device for making a transverse cut between the tail and the anus of the body of a bird which is suspended by its legs from a conveyor track. The device has a cutting disk and a support which can tilt the device about a first horizontal axis and about a second axis, above and parallel to the first axis. Two guide members are connected to the support. The first guide member is in the proximity of the cutting disk and at a short distance above the lower edge of the disk and the second guide member being spaced downwardly from the first guide.

6 Claims, 3 Drawing Figures

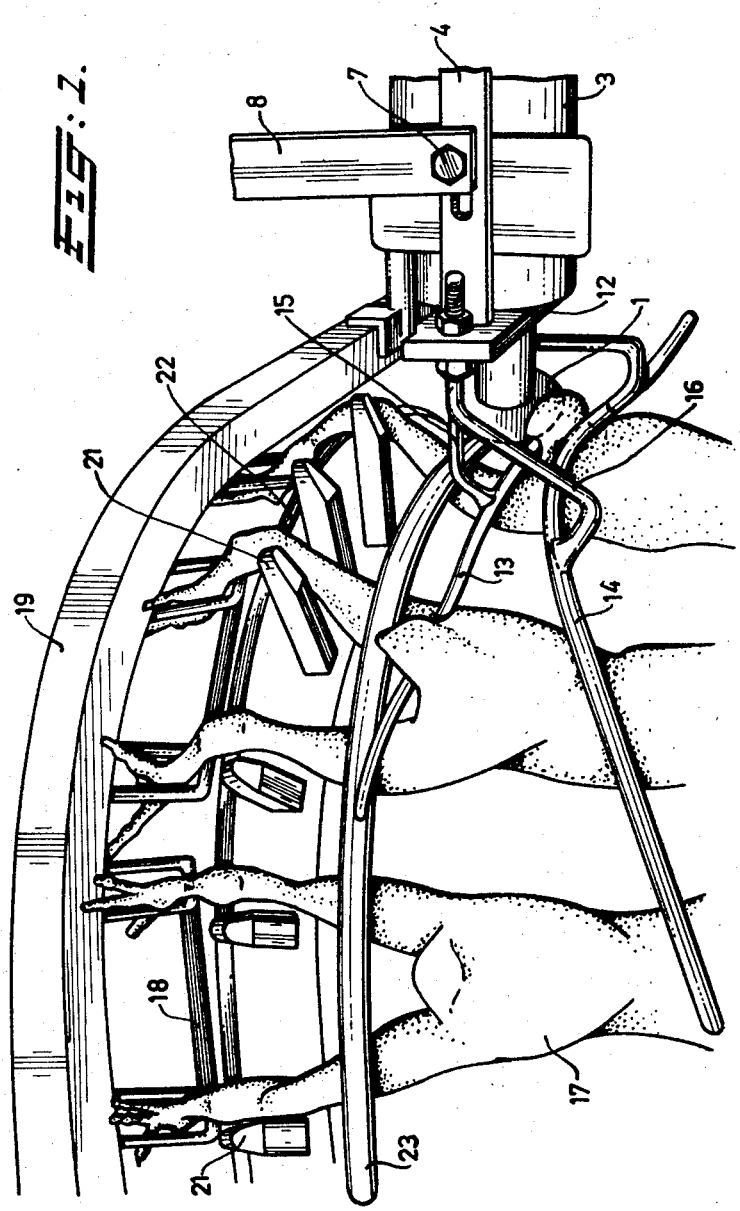

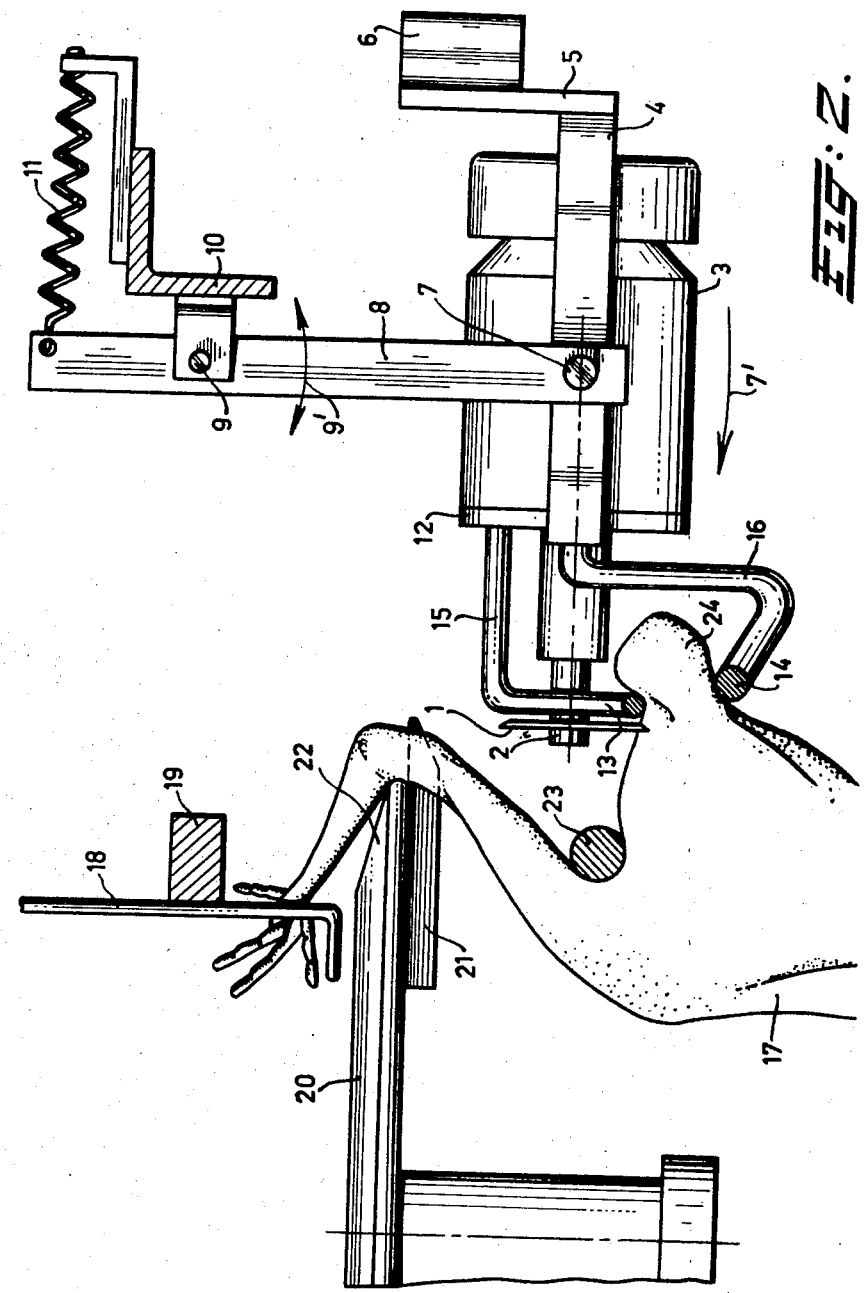

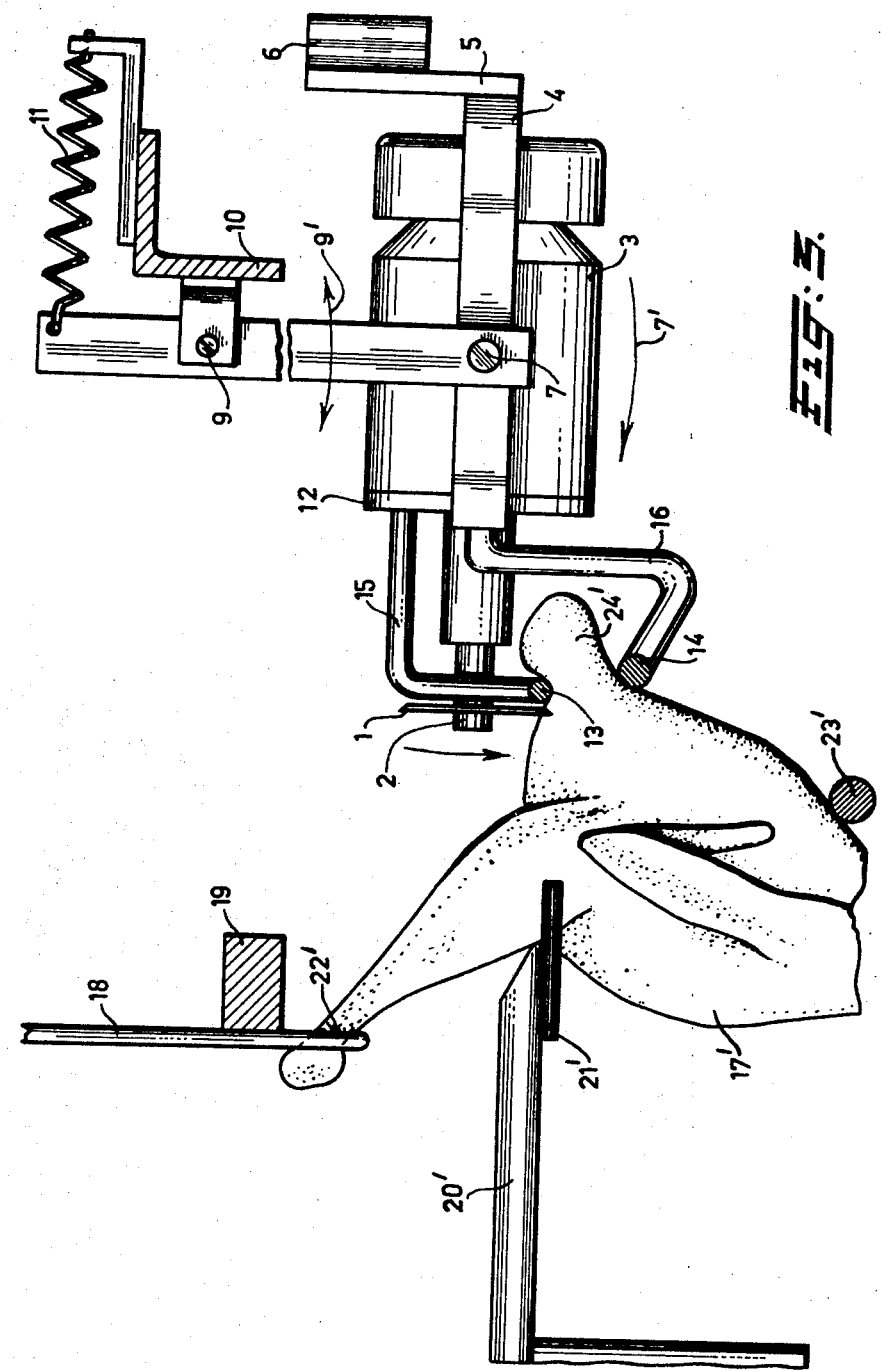

DEVICE FOR MAKING A CUT INTO THE BODY OF POULTRY

My invention relates to a device for cutting transversely, between the tail and the anus, into the body of a bird which is moved forwardly while hanging by its legs from a conveyor track.

In the mechanical processing of slaughtered poultry, at a particular stage of the process it is necessary to cut crosswise into the body of the bird between the tail and the anus. This cut serves as a starting cut for manually cutting the skin of the bird, starting from the two ends of the cross cut, in such a way that a triangular opening, including the anus and with an elongated side, is formed. The intestines can then be removed from this opening. Up to the present time this initial cross cut has been made by hand.

It is an object of my invention to provide a device for making this cross cut in such a manner that, within certain limits, this cut is always at the correct location on the body regardless of any variations in the size of the bird.

According to one aspect of my invention the device comprises a rotatably driven cutting disk whose supporting structure is capable of tilting about a first horizontal axis. The carrier for the structure is suspended in such a manner that it can swing about a second axis positioned above and parallel to the first axis. The cutting disk cooperates with two guide members connected to the supporting element. The first guide member is located in the proximity of the cutting disk and at a short distance above the lower edge of the disk and the second guide member is spaced downwardly from the first guide.

The guide members combined with the tiltable suspension of the cutting disk position the tail of the bird between the two guide members such that when the tail arrives at the disk, the disk is at the correct location to make the cut in the desired place on the bird and the depth of the cut is always constant.

Preferably, the element supporting the motor shaft is combined with or forms a part of an electric motor driving the cutting disk.

In a preferred embodiment of my invention the cutting disk cooperates with two vertically spaced positioning guides disposed in front of the disk. The lower guide is at approximately the level of the cutting edge of the disk. Both guides are arranged with respect to each other that the legs of a bird, moved along by a conveyor track, are bent about the edge of the upper guide at the location of the ankle joint.

The upper guide consists preferably of a catch disk, synchronously driven with the conveyor track and provided with radially extending gripper fingers. The lower guide rod is arranged inwardly of the outer edge of the catch disk. The cutting disk has two guide rods associated therewith and is arranged in such a way that the plane of the cutting disk is parallel to the tangent to the curved path determined by the guide disk.

The abovementioned embodiments are intended to be used in those cases in which the entire leg of the bird is still present. In a certain process, however, the legs have already been cut through at the ankle joint before the bird is conveyed to the station for the removal of the intestines. The birds are then further conveyed hanging by the remainder of the ankle joint. To handle these birds my invention provides an embodiment in which the cutting disk cooperates with two vertically spaced positioning guides in front of the disk. The upper guide is at approximately the level of the cutting edge of the disk to support the upper part of the legs and the lower guide supports the back of the bird in the vicinity of the bridge to the neck.

The upper guide consists preferably of a catch disk, synchronously driven with the conveyor track and provided with radially extending gripper fingers. The lower bent guide rod is arranged outside the outer edge of the catch disk. The cutting disk with its likewise bent guide rod is arranged in such a way that the plane of the cutting disk is parallel to the tangent to the curved path determined by the guide disk.

My invention will be clarified hereinafter with reference to the drawings which show two embodiments of my invention, wherein;

FIG. 1 is a perspective view of the device according to my invention;

FIG. 2 is a vertical cross section through the axis of the cutting disk, a part being, however, shown in side elevation;

FIG. 3 is a cross section similar to that of FIG. 2, but of an embodiment particularly for treating poultry which hangs on the conveyor track by its ankle joint.

The embodiment as shown in the drawings comprises a curved guide for the poultry. The device can be positioned at a location where the conveyor track along which the poultry is transported changes its direction, in particular, through an angle of about 90°. Obviously, a change of direction over a greater angle is possible and, in case suitable guides are used, the device can also be included in a straight part of the conveyor track.

The device according to the drawing comprises a rotating cutting disk 1, which is secured to a shaft 2 of an electric motor 3. This electric motor 3 is mounted in a frame having two longitudinal elements 4, which at the end remote from the cutting disk 1, are secured to a connecting plate 5 which carries a balance weight 6. The longitudinal elements 4 are supported by horizontal pivots 7 in substantially vertically suspended carriers 8 which, by means of a horizontal shaft 9, are pivotally mounted to a stationary frame 10. Provided between this stationary frame 10 and the upper end of the vertical carriers 8 is a (weak) tension spring 11. As a result of this arrangement the carrier 8 can perform a pivoting movement in the direction of the arrow 9' and the motor itself can perform a pivoting movement in the direction of the arrow 7'. Secured to the longitudinal elements 4 is a transverse plate 12 upon which are mounted guide rods 13, 14 by means of curved suspension rods 15, 16, respectively. Due to the tension spring 11, the cutting disk is always slightly urged toward the plane of the feeding track and, consequently, guide rods 13 and 14 will always grip around the tail of the bird, as illustrated.

The birds 17 are moved along suspended by their legs on conventional shackles 18. As mentioned hereinabove, the drawings represent an embodiment in which a guide path 19 changes its direction through an angle of 90° and for this purpose a disk 20, synchronously driven with the conveyor track, is used for guiding the birds. Along the circumference of the disk 20 are protruding gripper fingers 21 (the mutual spacing of which corresponds with the pitch or mutual spacing, respectively of the shackles 18). The front edge 22 of this disk 20 cooperates with a curved guide rod 23 located beneath the disk. As is shown in FIG. 1, this guide rod 23 is placed in such a way that the distance of the rod from the center of the disk 20 is less at the location of the cutting disk 1 than at the ends of the guide rod. As a consequence, the birds, which follow the track between the beginning of the rod 23 and the cutting disk 20, are slightly pulled upwards and are thus brought into the correct position in front of the cutting disk. The guide rods 13 and 14, between which the tail 24 of the bird is gripped, position the cutting disk 1 with respect to the body of the bird 17, so that the disk 1 cuts at the correct location. Since the motor 3 and thus the cutting disk 1 can turn on the horizontal shafts 7 and 9, an exact position is possible and the cut is always made at the correct location between the tail and the anus.

The embodiment in FIG. 3 corresponds substantially with that of FIG. 2, like reference numerals indicating like parts. This embodiment is particularly suited for processing poultry the legs of which have already been cut at the ankle joint. The birds 17' are then further conveyed hanging by the ankle joint 22' on the shackles 18. The catch disk 20' with its gripper fingers 21', which is synchronously driven with the conveyor belt, is now arranged at about the level of the cutting disk, the edge of the disk 20' pressing against the upper parts of the legs. The bird is further supported by a lower, curved, guide rod 23' located beneath the guide rod 14. Due to the cooperation of the guide rod 23' and the guide disk 20' which are provided at the correct location with respect to the shackles 18, the bird is moved forwardly to the cutting disk 1 in approximately the correct position for making the cut, as is shown in FIG. 3. The cutting disk can also adjust itself in this case because of the effect of the guides 13 and 14 and the pivotal suspension, into the correct position with respect to the tail 24'.

It will be understood that this invention is susceptible to modification in order to adapt it to different usages and conditions, and accordingly, it is desired to comprehend such modifications within this invention as may fall within the scope of the appended claims.

I claim:

1. A device for cutting the body of a bird crosswise between the tail and the anus, the bird being moved along on a conveyor track, said device comprising a rotatably driven cutting disk, a tiltable bearing support means for said cutting disk, said support being tiltable about a first horizontal axis and about a second axis lying above and parallel to the first axis, two guide members for the cutting disk connected to said support, said first guide member being located in the proximity of the cutting disk and at a short distance above the lower edge of the disk, and said second guide member being spaced down from the first guide member.

2. A device according to claim 1, in which the bearing support means includes an electric motor driving the cutting disk.

3. A device according to claim 1, in which the cutting disk also cooperates with two positioning guide means, provided in front thereof and one above the other, of which the lower one lies approximately at the level of the cutting edge of the disk, said guide means acting upon the legs of a bird, moving along a conveyor track, by bending said legs about the edge of the upper guide at the location of the ankle joint.

4. A device according to claim 3, in which the upper guide consists of a disk, synchronously driven with the conveyor track and provided with radially extending fingers, the lower, bent, guide rod being arranged inwards of the outer edge of the disk, and the cutting disk being positioned with the plane of the cutting disk parallel to the tangent to the curved path determined by the guide disk.

5. A device according to claim 1, in which the cutting disk cooperates with two positioning guides provided in front thereof and one above the other, of which the upper one lies approximately at the level of the cutting edge of the disk to support the upper part of the legs and the lower guide supports the back of the bird in the vicinity of the bridge part of the neck.

6. A device according to claim 5, in which the upper guide consists of a disk, synchronously driven with the conveyor track and provided with radially extending gripping fingers, the lower, bent, guide means being arranged outside the outer edge of the disk, and the cutting disk being positioned with the plane of the cutting disk parallel to the tangent to the curved path determined by the guided disk.

* * * * *